United States Patent
Uchida (10) Patent No.: US 10,073,804 B2
(45) Date of Patent: Sep. 11, 2018

(54) COMPUTER, SERVER, MODULE, CONNECTOR SET, ASSEMBLY METHOD, CONTROL METHOD, AND OPENING CONTROL PROGRAM

(71) Applicant: NEC Corporation, Tokyo (JP)

(72) Inventor: Kazuya Uchida, Tokyo (JP)

(73) Assignee: NEC Corporation, Tokyo (JP)

(*) Notice: Subject to any disclaimer, the term of this patent is extended or adjusted under 35 U.S.C. 154(b) by 232 days.

(21) Appl. No.: 15/083,598

(22) Filed: Mar. 29, 2016

(65) Prior Publication Data

US 2016/0292122 A1    Oct. 6, 2016

(30) Foreign Application Priority Data

Mar. 30, 2015   (JP) .................................. 2015-068246

(51) Int. Cl.
*G06F 13/42*    (2006.01)
*G06F 13/40*    (2006.01)

(52) U.S. Cl.
CPC ...... *G06F 13/4221* (2013.01); *G06F 13/4068* (2013.01)

(58) Field of Classification Search
CPC .......................... G06F 13/4221; G06F 13/4068
See application file for complete search history.

(56) References Cited

U.S. PATENT DOCUMENTS

2008/0082751 A1* 4/2008 Okin ................... G06F 13/1668
711/115

FOREIGN PATENT DOCUMENTS

| JP | 7-225640 | 8/1995 |
| JP | 2004-30315 | 1/2004 |
| JP | 2004-206462 | 7/2004 |
| JP | 2009-187172 | 8/2009 |
| JP | 2012-22463 | 2/2012 |

OTHER PUBLICATIONS

Japanese Office Action dated Apr. 26, 2016, by the Japanese Patent Office in counterpart Japanese Patent Application No. 2015-068246.

* cited by examiner

*Primary Examiner* — Ernest Unelus
*Assistant Examiner* — Ronald T Modo
(74) *Attorney, Agent, or Firm* — Finnegan, Henderson, Farabow, Garrett & Dunner, L.L.P.

(57) ABSTRACT

A computer includes: first and second connectors; and a data transmission path. The first connector includes: a first connector body to which at least a first module is capable of being attached; and a first electrode portion which is connected with the data transmission path. The first electrode portion is electrically connected with the first module when the first module is attached to the first connector body. The second connector includes: a second connector body to which at least the first module and a second module are alternatively capable of being attached; and a second electrode portion which is connected with the data transmission path. The second electrode portion is electrically connected with the second module when the second module is attached to the second connector body. The second electrode portion is electrically disconnected from the first module when the first module is attached to the second connector body.

12 Claims, 8 Drawing Sheets

COMPUTER, SERVER, MODULE, CONNECTOR SET, ASSEMBLY METHOD, CONTROL METHOD, AND OPENING CONTROL PROGRAM

This application is based upon and claims the benefit of priority from Japanese patent application No. 2015-068246, filed on Mar. 30, 2015, the disclosure of which is incorporated herein in its entirety by reference.

BACKGROUND OF THE INVENTION

Field of the Invention

The present invention relates to a computer, a server, a module, a connector set, a method for assembling a computer, a method for controlling a computer, and an opening control program.

Description of Related Art

In a computer in which a plurality of modules can be mounted in a single housing, there may be provided multiple types of slots in accordance with the types of modules, such as a slot that is capable of attaching a CPU module, a slot that is capable of attaching a storage module, and a slot that is capable of attaching an input/output (IO) module.

Japanese Unexamined Patent Application No. 2009-187172 (hereinbelow called Patent Document 1) discloses a server device that includes a connector for a CPU module that connects a CPU module, a connector for an IO module that connects an IO module, and a dual-use connector for CPU/IO modules that alternatively connects a CPU module and an IO module. In the dual-use connector for CPU/IO modules of the server device of Patent Document 1, the connector for a CPU module and the connector for an IO module are integrated, with locations where a CPU module and an IO module are inserted being respectively individually provided.

A computer such as a microserver that includes a plurality of slots is designed to allow mounting of CPU modules and extension modules in accordance with a client's specification.

However, when installing special-purpose slots in accordance with the types of these modules in the manner of Patent Document 1, a design alternation becomes necessary for each client's specification, leading to design complications and cost increases.

SUMMARY OF THE INVENTION

An exemplary object of the present invention is to provide a computer, a server, a module, a connector set, a method for assembling a computer, a method for controlling a computer, and an opening control program capable of improving the expandability of a server and inhibiting complication of design and cost increases.

A computer according to a first exemplary aspect of the present invention includes: a first connector; a second connector; and a data transmission path that connects the first connector and the second connector. The first connector includes: a first connector body to which at least a first module is capable of being attached, and a first electrode portion which is connected with the data transmission path, the first electrode portion being electrically connected with the first module when the first module is attached to the first connector body. The second connector includes: a second connector body to which at least the first module and a second module are alternatively capable of being attached, the second module being controlled by the first module; and a second electrode portion which is connected with the data transmission path, the second electrode portion being electrically connected with the second module when the second module is attached to the second connector body, the second electrode portion being electrically disconnected from the first module when the first module is attached to the second connector body.

A computer according to a second exemplary aspect of the present invention includes: a first connector; a second connector; and a data transmission path that connects the first connector and the second connector. The first connector includes: a first connector body to which at least a second module is capable of being attached; and a first electrode portion which is connected with the data transmission path, the first electrode portion being electrically connected with the second module when the second module is attached to the first connector body. The second connector includes: a second connector body to which at least a first module and the second module are alternatively capable of being attached; and a second electrode portion which is connected with the data transmission path, the second electrode portion being electrically connected with the second module when the second module is attached to the second connector body, the second electrode portion being electrically disconnected from the first module when the first module is attached to the second connector body.

A server according to a third exemplary aspect of the present invention includes: one of the above-recited computer. The first module includes a control unit, and the second module includes an extension unit that extends a function of the control unit.

A module according to a fourth aspect of the present invention includes: a module body which is capable of being attached to each of a first connector and a second connector, the first connector being connected with a data transmission path, the second connector being connected with the data transmission path; and an electrode portion which is electrically connected with the first connector when the module body is attached to the first connector, the electrode portion being electrically disconnected from the second connector when the module body is attached to the second connector.

A module according to a fifth aspect of the present invention includes: a module body which is capable of being attached to each of a first connector and a second connector, the first connector being connected with a data transmission path, the second connector being connected with the data transmission path; and an electrode portion which is electrically disconnected from the first connector when the module body is attached to the first connector, the electrode portion being electrically connected with the second connector when the module body is attached to the second connector.

A connector set according to a sixth aspect of the present invention includes: a first connector including a first connector body and a first electrode, at least a first module being capable of being attached to the first connector body, the first electrode being electrically connected with the first module when the first module is attached to the first connector body; and a second connector including a second connector body and a second electrode, at least the first module and a second module being alternatively capable of being attached to the second connector body, the second module being controlled by the first module, the second electrode being electrically connected with the second module when the second module is attached to the second connector body, the second electrode being electrically disconnected from the first module when the first module is attached to the second connector body; and a data transmission path that connects the first electrode and the second electrode.

A method according to seventh aspect of the present invention is for assembling a computer. The method includes: attaching a first module to a first connector, the first connector including a first connector body and a first electrode portion, at least the first module and a third module being alternatively capable of being attached to the first connector body, the first electrode portion being connected with a data transmission path, the first electrode portion being electrically connected with the first module when the first module is attached to the first connector body, the first electrode portion being electrically connected with the third module when the third module is attached to the first connector body; and attaching one of a second module and the third module to the second connector, the second connector including a second connector body and a second electrode portion, at least the third module and the second module being alternatively capable of being attached the second connector body, the second module being controlled by the first module, the second electrode portion being connected with the data transmission path, the second electrode portion being electrically connected with the second module when the second module is attached to the second connector body, the second electrode portion being electrically disconnected from the third module when the third module is attached to the second connector body.

A method according to eighth aspect of the present invention is for controlling a computer. The computer includes: a first connector; a second connector; and a data transmission path that connects the first connector and the second connector. The first connector includes: a first connector body to which at least a first module is capable of being attached; and a first electrode portion which is connected with the data transmission path, the first electrode portion being electrically connected with the first module when the first module is attached to the first connector body. The second connector includes: a second connector body to which at least the first module and a second module are alternatively capable of being attached, the second module being controlled by the first module; and a second electrode portion which is connected with the data transmission path, the second electrode portion being electrically connected with the second module when the second module is attached to the second connector body, the second electrode portion being electrically disconnected from the first module when the first module is attached to the second connector body. The method includes: determining, by the first module, whether the second module is recognized; controlling the second module by the first module when it has been determined that the second module is recognized by the first module; and operating the first module alone when it has been determined that the second module is not recognized by the first module.

A non-transitory computer-readable storage medium according to a ninth stores an opening control program for a first module of a computer. The computer includes: a first connector; a second connector; and a data transmission path that connects the first connector and the second connector. The first connector includes: a first connector body to which at least a first module is capable of being attached; and a first electrode portion which is connected with the data transmission path, the first electrode portion being electrically connected with the first module when the first module is attached to the first connector body. The second connector includes: a second connector body to which at least the first module and a second module are alternatively capable of being attached, the second module being controlled by the first module; and a second electrode portion which is connected with the data transmission path, the second electrode portion being electrically connected with the second module when the second module is attached to the second connector body, the second electrode portion being electrically disconnected from the first module when the first module is attached to the second connector body. The opening control program causes the first module to execute: determining, by the first module, whether the second module is recognized; controlling the second module by the first module when it has been determined that the second module is recognized by the first module; and operating the first module alone when it has been determined that the second module is not recognized by the first module.

According to the aforementioned computer, it is possible to improve the expandability of a server, and also inhibit design complications and cost increases.

EXEMPLARY EMBODIMENT

First Exemplary Embodiment

Next, a description will be given for a computer, a module, and a connector set according to a first exemplary embodiment of the present invention, with reference to the drawings.

Figure 1:
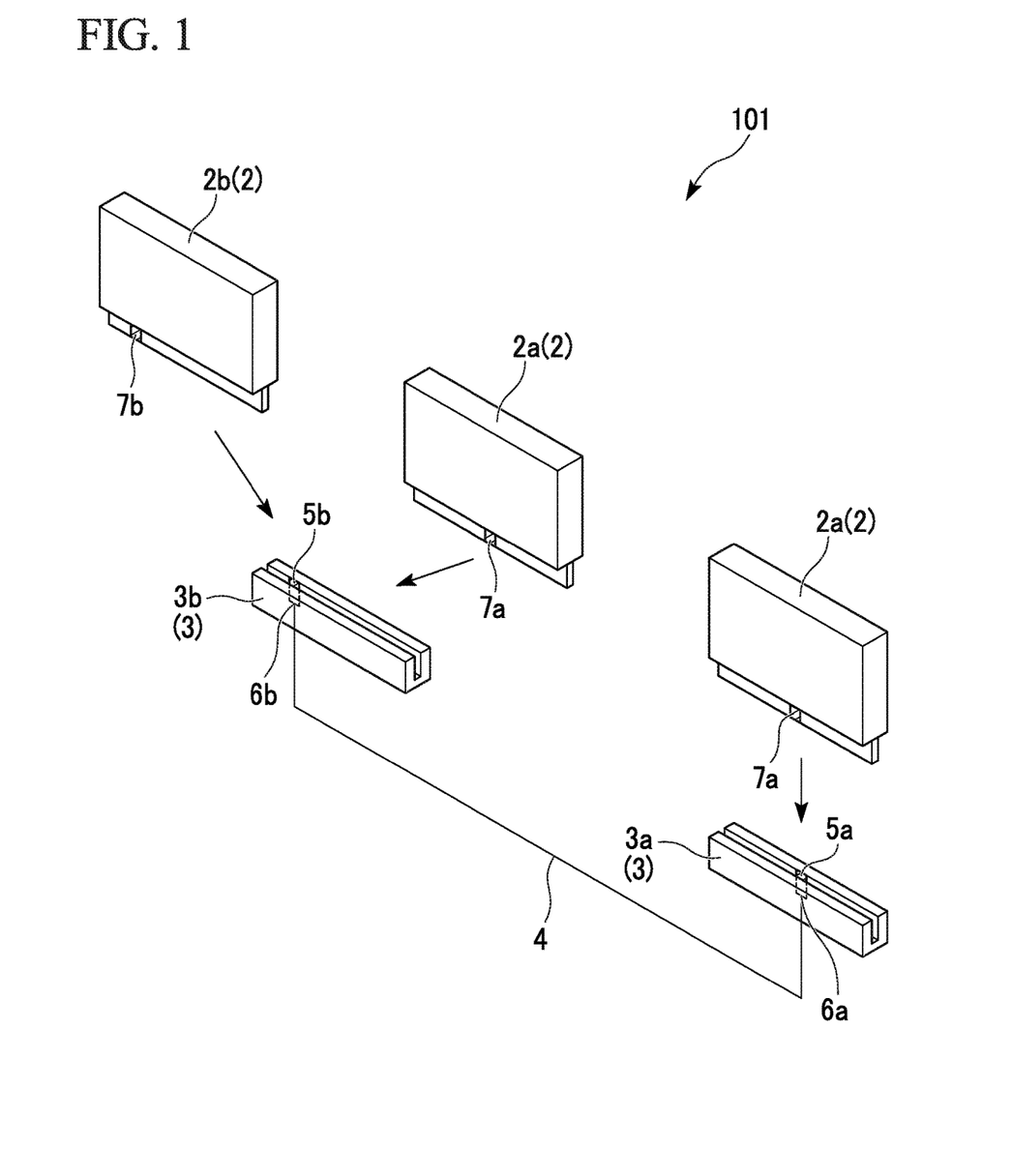
FIG. 1 is a perspective diagram of a computer in a first exemplary embodiment of the present invention.

FIG. 1 is a perspective diagram of the computer in the first exemplary embodiment of the present invention.

As shown in FIG. 1, a computer 101 includes a module 2, a connector 3, and a data transmission path 4. This computer 101 can for example be applied to a complex-type high-density server capable of accommodating a plurality of server units.

The module 2 includes hardware and programs for realizing various functions. The module 2 includes modules of at least two types, namely, a first module (module, third module) 2a and a second module 2b which have different functions from each other. The first module 2a may include for example a CPU (central processing unit) and perform various operation processing and control processing. The second module 2b is controlled by the first module 2a. This second module 2b is a so-called extension module that extends the functions of the first module 2a. Examples of the second module 2b include an extension module having a network interface. The first module 2a and the second module 2b each are capable of being attached to the connector 3. In this exemplary embodiment, a module set including at least the two types of the first module 2a and the second module 2b is constituted as a plurality of the modules 2.

The connector 3 includes a first connector 3a and a second connector 3b. The first connector 3a includes a first electrode (electrode portion) 5a. Also, the second connector 3b includes a second electrode (electrode portion) 5b. The first module 2a is attached to the first connector 3a. That is, the first connector 3a includes a first connector body to which the first connector 3a is connected. The first module 2a and the second module 2b are alternatively attached to the second connector 3b. That is, the second connector 3b includes a second connector body to which the first module 2a and the second module 2b are alternatively attached. Here, in the operation of the computer 101, the first connector 3a in the first exemplary embodiment is configured so that the second module 2b is not attached thereto. However, the first connector 3a has a shape allowing both the first module 2a and the second module 2b to be attached and detached similarly to the second connector 3b.

The data transmission path 4 connects the first connector 3a and the second connector 3b. This data transmission path 4 enables data transmission between the first connector 3a and the second connector 3b. As this data transmission path 4, a data transmission path formed by the "PCI Express" (Peripheral Components Interconnect Express) standard may be used.

A first end (end portion) 6a of the data transmission path 4 is connected to the first electrode 5a. A second end (end portion) 6b of the data transmission path 4 on the opposite side of the first end 6a is connected to the second electrode 5b. The first electrode 5a includes the first connector 3a therewithin. Similarly, the second electrode 5b includes the second connector 3b therewithin. In the example of FIG. 1, one first electrode 5a and one second electrode 5b are illustrated. However, an exemplary embodiment of the present invention is not limited thereto. In the case of the aforementioned "PCI Express", the first electrode 5a and the second electrode 5b are each constituted by a plurality of electrodes. The connector set of the exemplary embodiment of the present invention is constituted by the aforementioned first connector 3a, the second connector 3b, and the data transmission path 4.

The arrangement of the second electrode 5b in the second connector 3b differs from the arrangement of the first electrode 5a in the first connector 3a. That is, the arrangement of the second electrode 5b with respect to the second connector 3b differs from the arrangement of the first electrode 5a with respect to the first connector 3a.

The first module 2a includes an electrode (electrode portion) 7a used for performing data transmission with the second module 2b. The second module 2b includes an electrode (electrode portion) 7b used for performing data transmission with the first module 2a.

The electrode 7a is connected with the first electrode 5a when the first module 2a is attached to the first connector 3a. That is, the first electrode 5a of the first connector 3a is electrically connected with the first module 2a. Similarly, the electrode 7b is connected with the second electrode 5b when the second module 2b is attached to the second connector 3b. That is, the second electrode 5b of the second connector 3b is electrically connected with the second module 2b.

As described above, the arrangement (position) of the second electrode 5b in the second connector 3b differs from the arrangement (position) of the first electrode 5a in the first connector 3a. Therefore, when the first module 2a is attached to the second connector 3b, the electrode 7a is not connected to the second electrode 5b. Also, even if the second module 2b is mistakenly attached to the first connector 3a, the electrode 7b is not connected to the first electrode 5a.

Figure 2:
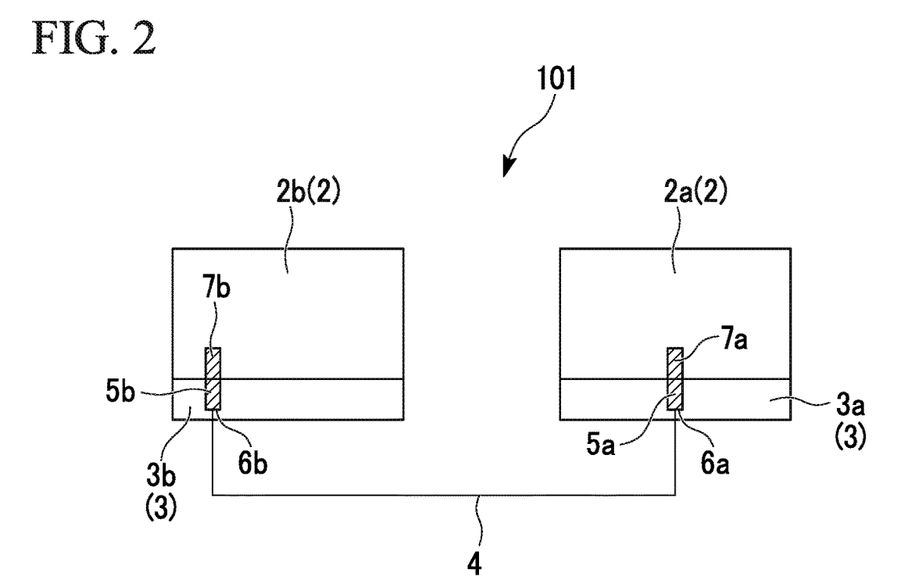
FIG. 2 is a diagram showing the state of a first module attached to a first connector and a second module attached to a second connector in the first exemplary embodiment of the present invention.
Figure 3:
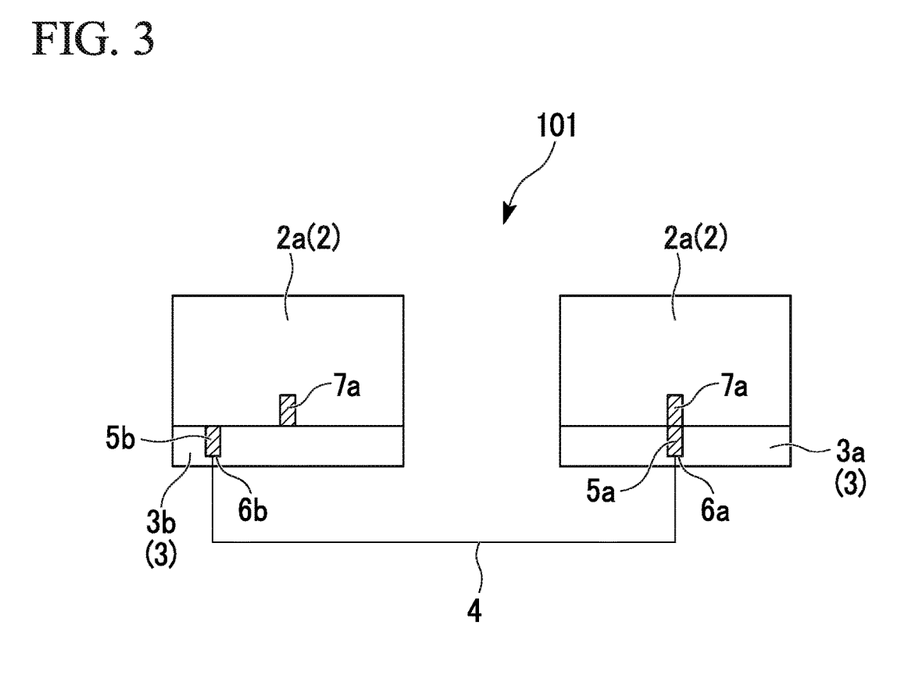
FIG. 3 is a diagram showing the state of the first module attached to both the first connector and the second connector in the first exemplary embodiment of the present invention.

FIG. 2 is a diagram showing the state of the first module 2a connected to the first connector 3a and the second module 2b connected to the second connector 3b in the first exemplary embodiment of the present invention. FIG. 3 is a diagram showing the state of the first modules 2a connected to both of the first connector 3a and the second connector 3b in the first exemplary embodiment of the present invention.

In this manner, according to the first exemplary embodiment described above, in the case of the first module 2a being attached to the first connector 3a and the second module 2b being attached to the second connector 3b as shown in FIG. 2, the first module 2a and the second module 2b are connected via the data transmission path 4 whereby data transmission becomes possible between the first and second modules 2a and 2b. That is, control of the second module 2b by the first module 2a becomes possible.

On the other hand, in the case of the first modules 2a being attached to both of the first connector 3a and the second connector 3b as shown in FIG. 3, the first module 2a is not electrically connected to the second electrode 5b of the second connector 3b. For that reason, it is possible to individually operate the first modules 2a without performing any identification processing between the first modules 2a.

As a result, since there is no need to individually provide a dedicated connector for the first module 2a and a dedicated connector for the second module 2b, it is possible to avoid complication of design arising from design changes according to the client's specification. Moreover, since it is possible to determine the type of module connected to the second connector 3b from the first module 2a connected to the first connector 3a with a simple constitution, it is possible to inhibit cost increases.

Modification of First Exemplary Embodiment

In the first exemplary embodiment, a description has been given for the case of the first electrode 5a of the first connector 3a being electrically connected with the first module 2a. Moreover, in the first exemplary embodiment, a description has been given for the case of the second electrode 5b of the second connector 3b being electrically connected with the second module 2b, and not electrically connected with the first module 2a. However, electrical connection of the first module 2a and the second module 2b with respect to the first electrode 5a and the second electrode 5b is not limited to the aforementioned combinations. It is sufficient that the first electrode 5a is electrically connectable with the first module 2a or the second module 2b, and the second electrode 5b is electrically connectable with the first module 2a or the second module 2b.

Figure 4:
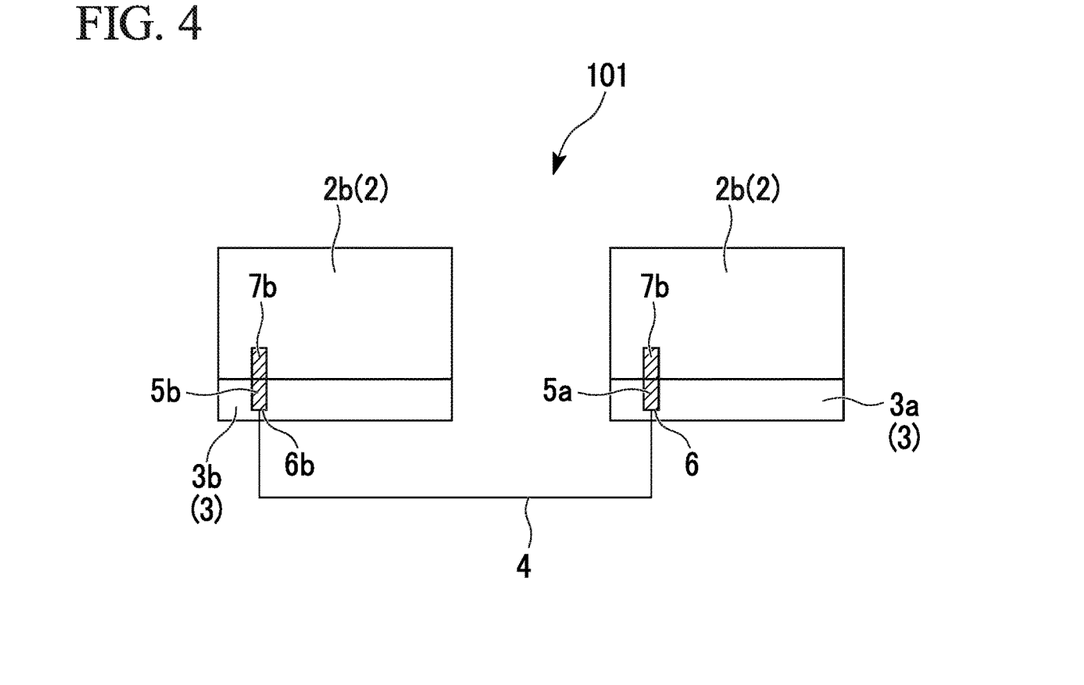
FIG. 4 is a diagram showing the state of the second module attached to the first connector and the second connector in a modification of the first exemplary embodiment of the present invention.
Figure 5:
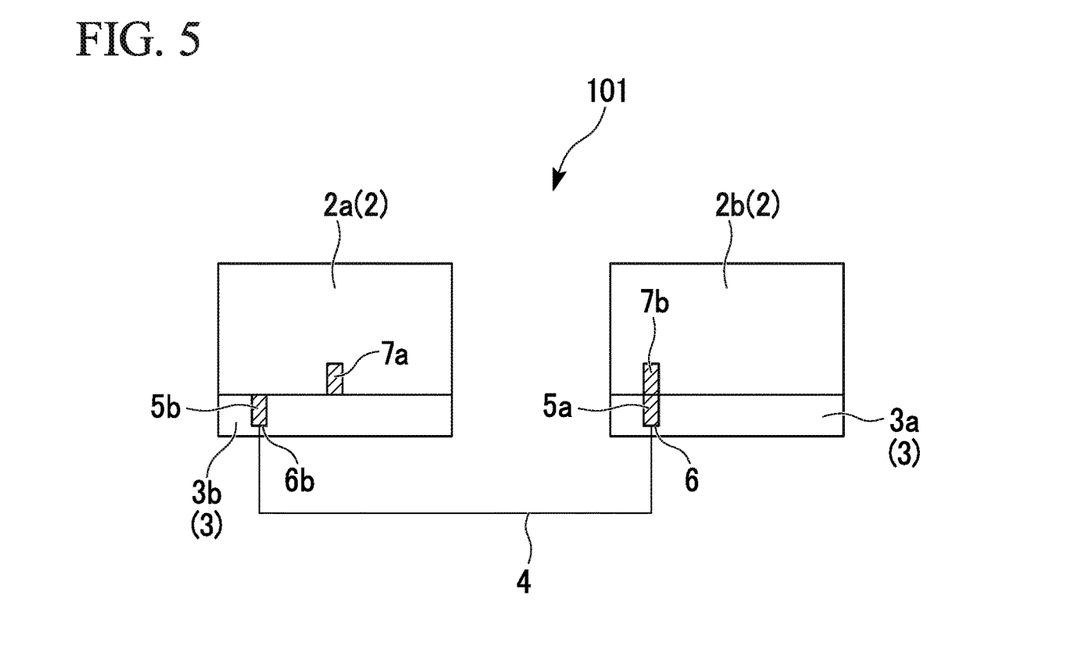
FIG. 5 is a diagram showing the state of the second module attached to the first connector and the first module attached to the second connector in the modification of the first exemplary embodiment of the present invention.

FIG. 4 is a diagram showing the state of the second modules 2b attached to each of the first connector 3a and the second connector 3b in the modification of the first exemplary embodiment of the present invention. FIG. 5 is a diagram showing the state of the second module 2b attached to the first connector 3a and the first module 2a attached to the second connector 3b in the modification of the first exemplary embodiment of the present invention.

As shown in the examples of FIG. 4 and FIG. 5, the first electrode 5a and the second electrode 5b may both be made electrically connectable with the second module 2b. In this case, a state arises in which the first module 2a is not electrically connected to either of the first electrode 5a and the second electrode 5b. That is, the first module 2a always operates independently without controlling the second module 2b. Here, in the case of the connection modes illustrated in FIG. 4 and FIG. 5, the second module 2b may be controlled by another control device not illustrated, and one second module 2b may be made to control another second module 2b.

Figure 6:
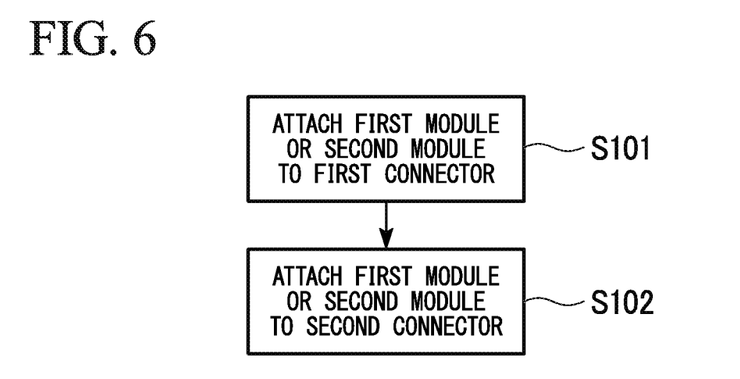
FIG. 6 shows the flow of an assembly method for a computer in the first exemplary embodiment of the present invention and the modification thereof.

FIG. 6 shows the flow of the assembly method for a computer in the first exemplary embodiment of the present invention and the modification thereof.

In the assembly method, first, as shown in FIG. 6, the first module 2a or the second module 2b is attached to the first connector 3a (Step S101). Next, the first module (third module) 2a or the second module 2b is attached to the second connector 3b (Step S102).

Thereby, in the case of the first module 2a or the second module 2b being electrically connected to the first electrode 5a at the first connector 3a, and the first module 2a or the second module 2b being electrically connected to the second electrode 5b at the second connector 3b, either one of the first module 2a or the second module 2b attached to the first connector 3a and the first module 2a or the second module 2b attached to the second connector 3b can control the other.

Second Exemplary Embodiment

Next, the second exemplary embodiment of the present invention will be described with reference to the drawings. This second exemplary embodiment differs on the point of a plurality of the connectors of the first exemplary embodiment described above being arrayed on a substrate. For that reason, it will be described with the same reference symbols given to the parts that are the same as those of the first exemplary embodiment, with overlapping descriptions being omitted.

Figure 7:
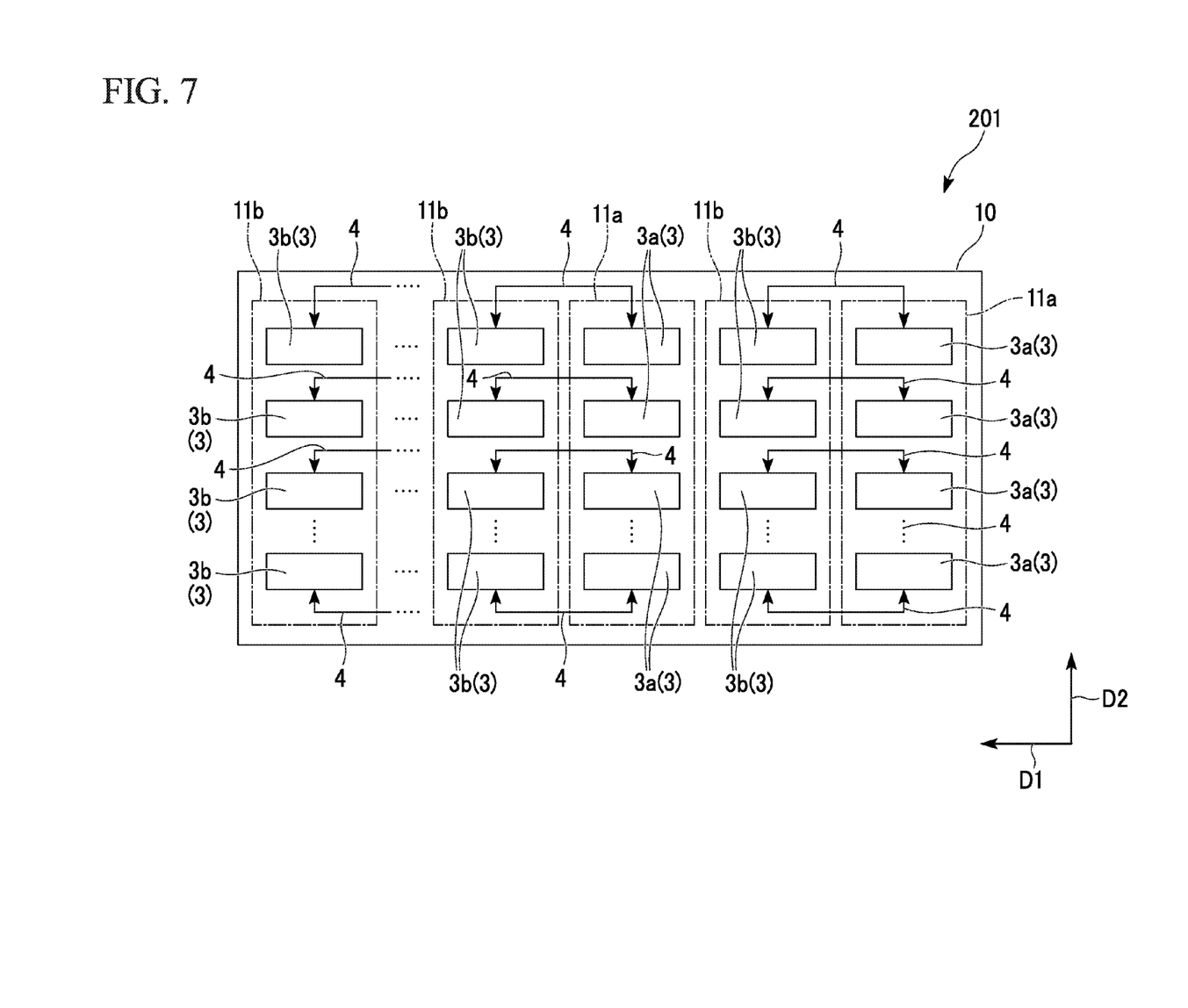
FIG. 7 is a plan view of a computer in a second exemplary embodiment of the present invention.

FIG. 7 is a plan view of a computer in the second exemplary embodiment of the present invention.

As shown in FIG. 7, a computer 201 of this second exemplary embodiment includes modules 2 (not shown), connectors 3, data transmission paths 4, and a substrate 10.

The connectors 3 are fixed on the substrate 10. A plurality of the connectors 3 are arrayed in a first direction D1. More specifically, the connectors 3a and the connectors 3b are arranged in the first direction D1 with one of the connectors 3a and one of the connectors 3b being arranged alternately. A plurality of the connectors 3 are moreover arrayed in a second direction S2 along the surface of the substrate 10 intersecting the first direction D1. That is, the connectors 3 are arranged in a matrix. The connectors 3 form a plurality of lines (rows) of connectors 3a and a plurality of lines (rows) of connectors 3b with one of the lines of the connectors 3a and one of the lines of the connectors 3b being arranged alternatively. In the second exemplary embodiment, the case of the second direction D2 intersecting perpendicularly with the first direction D1 will described as an example. However, an exemplary embodiment of the present invention is not limited to thereto. The second direction D2 may not intersect perpendicularly with the first direction D1. Also, the number of the connectors 3 arrayed in the first direction D1 and the second direction S2 shown in FIG. 7 is merely an example, and, an exemplary embodiment of the present invention is not limited to this number. In FIG. 7, the first direction D1 and the second direction D2 of the second exemplary embodiment are indicated by arrows.

The connectors 3 include a first connector 3a and a second connector 3b in the same manner as the first exemplary embodiment described above. The first connector 3a in the second exemplary embodiment is arranged in odd-numbered columns 11a. On the other hand, the second connector 3b is arranged in even-numbered columns 11b.

Here, one of the odd-numbered columns is denoted as an N column, and one of the even-numbered columns which is adjacent to the one odd-numbered column is denoted as an N+1 column. In this case, each of the first connectors 3a arranged in the N column is connected via the data transmission path 4 with the second connector 3b that is adjacent in the first direction D1, among the second connectors 3b arranged in the N+1 column.

The substrate 10 may be configured from a printed circuit board (PCB), for example. This substrate 10 is used with being housed in a housing (not illustrated). The data transmission paths 4 are formed on this substrate 10. As this substrate 10, a multi-layer printed substrate may also be used.

Accordingly, according to the second exemplary embodiment described above, in the case of wanting to perform linked operation of the first module 2a and the second module 2b, it is only required that the first module 2a is attached to the first connector 3a of the N column, which is an even-numbered column, and the second module 2b is attached to the second connector 3b that is adjacent in the first direction D1 with first connector 3a to which this first module 2a is attached.

Thereby, it is possible to control the second module 2b by the first module 2a via the data transmission path 4 formed on the substrate 10. On the other hand, in the case of wanting to operate the first module 2a independently with no connection with the second module 2b, it is possible to operate the first module 2a by connecting the first module 2a to any of the plurality of connectors 3. For that reason, even in the case of a plurality of connectors 3 being arrayed on the substrate 10, it is possible to easily grasp the connection state of the first module 2a and the second module 2b based on the arrangement of the first and second modules 2a and 2b in the first direction D1.

Also, in the second exemplary embodiment, the connector 3 is arranged such that the long-side direction of the connector 3 faces the first direction D1. That is, the long-side direction of the connector 3 extends in the first direction D1. Therefore, it is possible to easily grasp the first direction D1 based on the long-side direction of the connector 3.

Here, in the computer 201 of the second exemplary embodiment described above, the case has been illustrated of the long-side direction of the connector 3 facing the first direction D1. However, an exemplary embodiment of the present invention is not limited to this constitution. For example, the short-side direction of the connector 3 may face the first direction D1. The short-side direction of the connector 3 may extend in the first direction D1. In the case of the short-side direction of the connector 3 being made to face the first direction D1 in this way, it is possible to connect the first connector 3a and the second connector 3b in the shortest distance. For that reason, there is an advantage in that it is possible to reduce the wiring impedance of the data transmission path 4.

Third Exemplary Embodiment

Next, the third exemplary embodiment of the present invention will be described with reference to the drawings. This third exemplary embodiment is one that applies the constitutions of the exemplary embodiments given above to a high-density server capable of mounting a plurality of server units. For that reason, in the third exemplary embodiment a description is given with the same reference symbols given to the parts that are the same as those of the aforementioned exemplary embodiments. Also, overlapping descriptions are omitted. In addition, in the description of the third exemplary embodiment, one connector set is described as a representative example among the plurality of connector sets.

Figure 8:
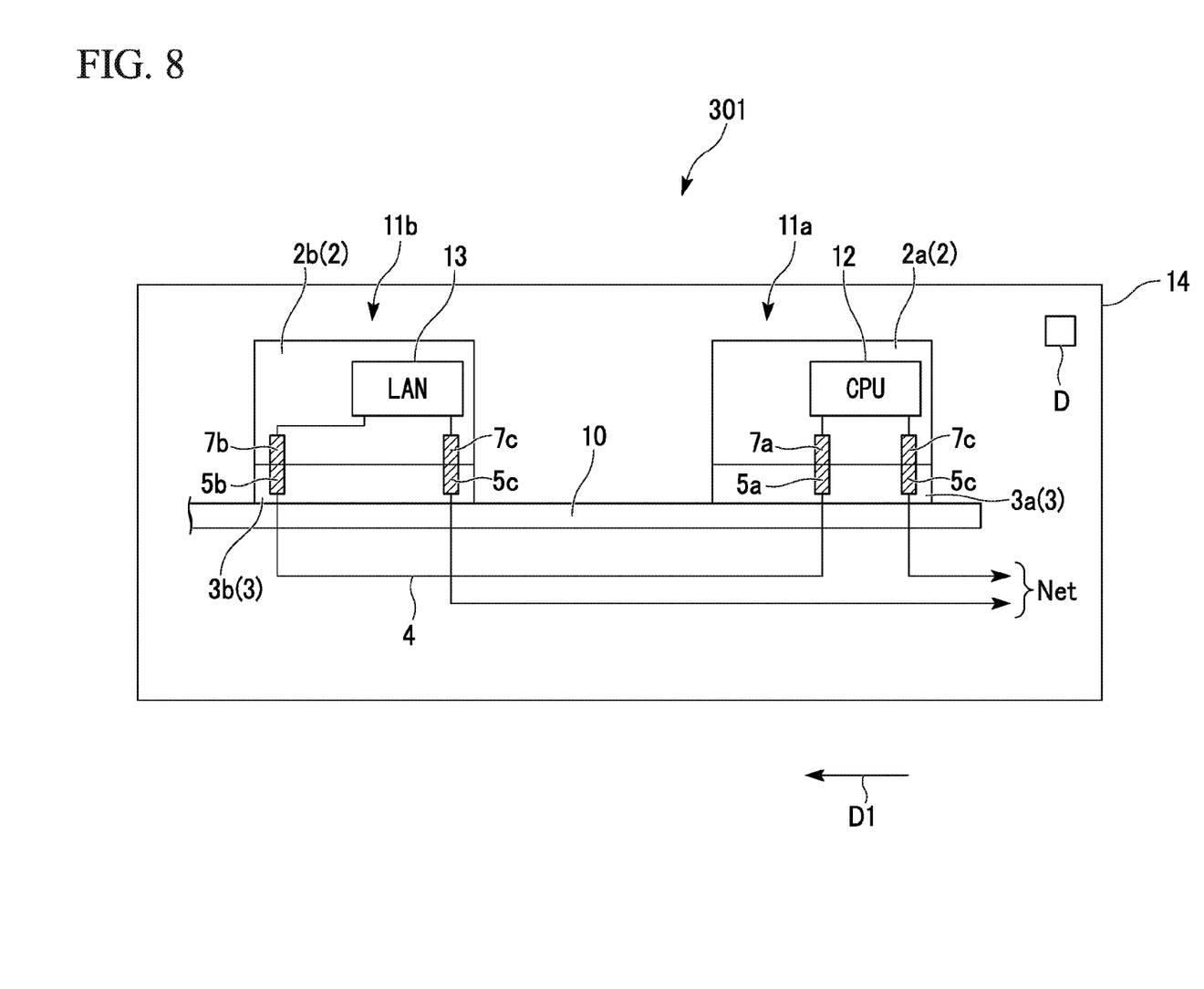
FIG. 8 is a diagram corresponding to FIG. 2 in a third exemplary embodiment of the present invention.
Figure 9:
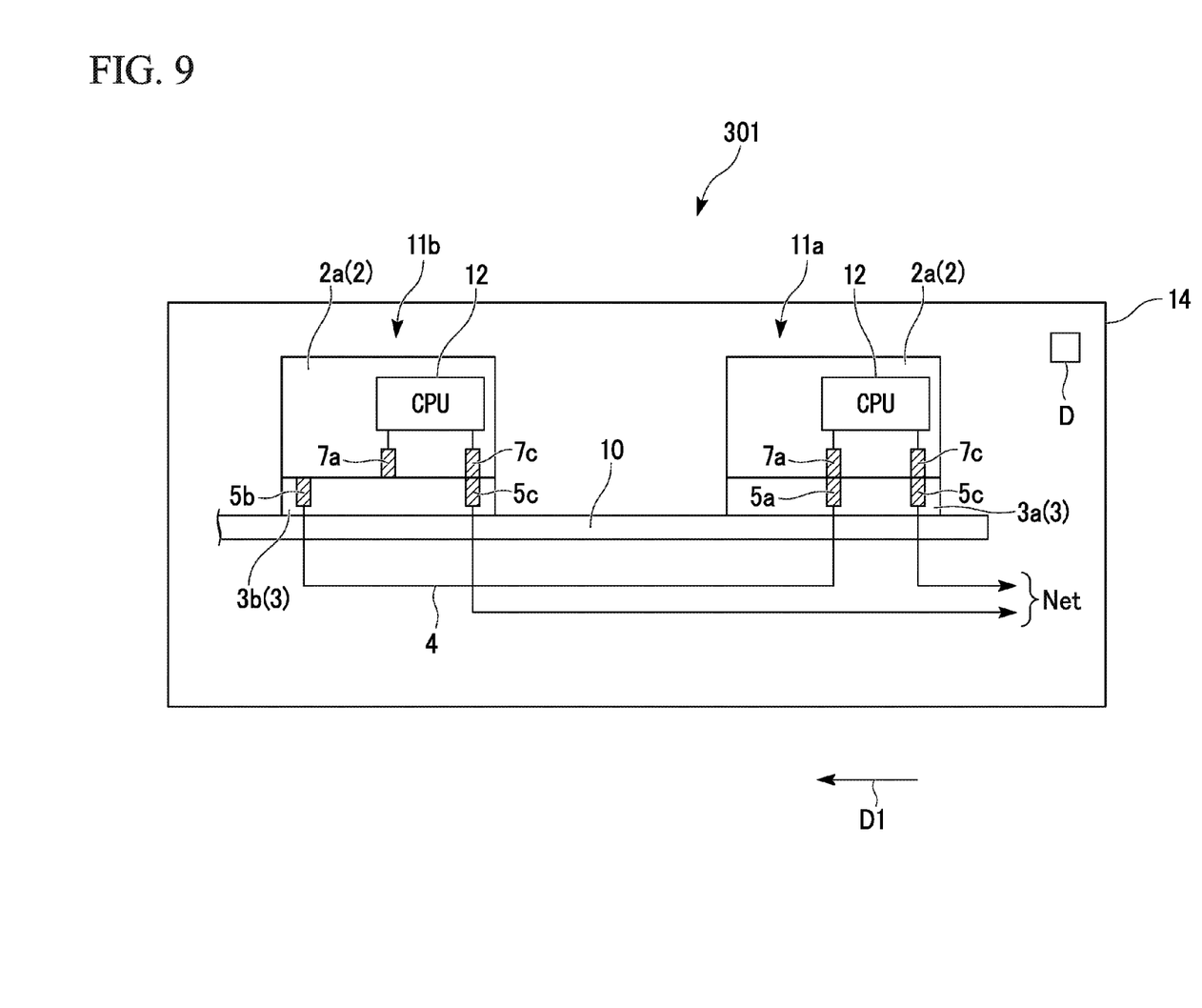
FIG. 9 is a diagram corresponding to FIG. 3 in the third exemplary embodiment of the present invention.

FIG. 8 is a diagram corresponding to FIG. 2 in the third exemplary embodiment of the present invention. FIG. 9 is a diagram corresponding to FIG. 3 in the third exemplary embodiment of the present invention.

As shown in FIG. 8, a computer 301 in the third exemplary embodiment includes a first module 2a, a second module 2b, a first connector 3a, a second connector 3b, a data transmission path 4, a substrate 10, and a housing 14.

The first module 2a has a control unit (CPU) 12. The second module 2b, on the other hand, has an extension unit (LAN) 13. The second module 2b extends the communication function of the first module 2a.

When the first module 2a is attached to the first connector 3a arrayed in the N column described above, the control unit 12 thereof is electrically connected to the first electrode 5a of the first connector 3a. On the other hand, in the case of the first module 2a being attached to the second connector 3b arrayed in the N+1 column described above (refer to FIG. 9), the control unit 12 thereof is not electrically connected to the second electrode 5b of the second connector 3b.

When the second module 2b is attached to the second connector 3b, the extension unit 13 thereof is electrically connected to the second electrode 5b of the second connector 3b. Also in the operation of the computer 301, the second module 2b in the third exemplary embodiment is not connected to the first connector 3a. That is, by the first module 2a being attached to the first connector 3a, and the second module 2b being attached to the second connector 3b, data transmission becomes possible between the extension unit 13 and the control unit 12. Thereby, a state arises in which the operation of the extension unit 13 is controlled by the control unit 12. That is, with the communication function of the first module 2a being extended, the combination of the first module 2a and the second module 2b can operate as one server.

The first connector 3a and the second connector 3b in the third exemplary embodiment each include a third electrode (electrode portion) 5c. The third electrodes 5c are connected to a network (Net) such as a LAN (Local Area Network). With regard to each third electrode 5c provided in the first connector 3a and the second connector 3b, the arrangement in the first connector 3a and the arrangement in the second connector 3b are respectively the same. That is, the arrangement of the third electrode 5c with respect to the first connector 3a is the same as the arrangement of the third electrode 5b with respect to the first connector 3c.

The first module 2a and the second module 2b each include an electrode (electrode portion) 7c. The electrode 7c of each of the first and second modules 2a and 2b is electrically connected with the third electrode 5c in either of the cases of being attached to the first connector 3a and being attached to the second connector 3b. That is, the first modules 2a are capable of operating independently in the case of being attached to either of the first connector 3a and the second connector 3b.

Next, an assembly method for the computer 301 in the third exemplary embodiment described above will be described referring to the appended drawings.

Figure 10:
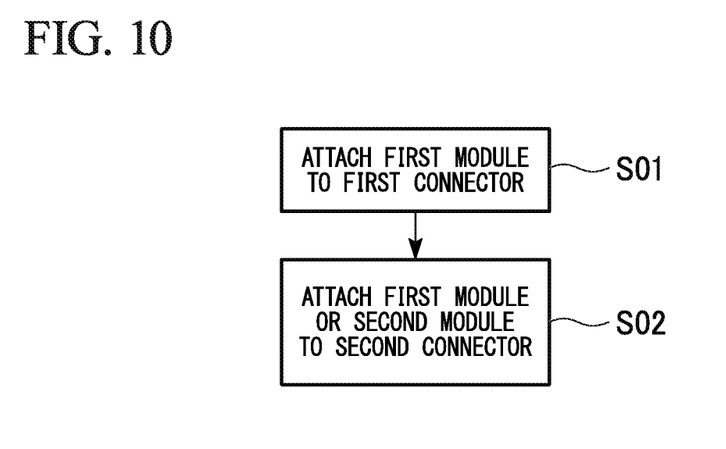
FIG. 10 shows the flow of an assembly method for a computer in the third exemplary embodiment of the present invention.

FIG. 10 shows the flow of the assembly method for the computer 301 in the third exemplary embodiment of the present invention.

As shown in FIG. 10, first the first module 2a is attached to the first connector 3a (Step S01). Next, one of the first module (third module) 2a and the second module 2b is attached to the second connector 3b (Step S02).

Here, as shown in FIG. 9, in the case of attaching the first modules 2a to both of the first connector 3a and the second connector 3b, the control unit 12 of the first module 2a attached to the first connector 3a is connected to the first electrode 5a of the first connector 3a. However, the control unit 12 of the first module 2a attached to the second connector 3b is not connected to the second electrode 5b of the second connector 3b. Thereby, these control units 12 are in a state of not being able to recognize each other via the data transmission path 4. That is, the control units 12 each can operate as independent servers.

On the other hand, as shown in FIG. 8 above, when the first module 2a is attached to the first connector 3a and the second module 2b is attached to the second connector 3b, the extension unit 13 is capable of data transmission with the control unit 12. Thereby, the operation of the extension unit 13 can be controlled by the control unit 12. In other words, the communication function of the first module 2a is extended, whereby the combination of the first module 2a and the second module 2b operate as one server.

Here, in order to determine the presence of the attachment of the second module 2b to the second connector 3b, the first module 2a attached to the first connector 3a may perform a recognition operation of the second module 2b at a predetermined timing. Also, in the third exemplary embodiment, only one combination of the first module 2a and the second module 2b has illustrated. However, an exemplary embodiment of the present invention is not limited to such configuration. The same applies to the case of a plurality of connectors 3 being arrayed on the substrate 10 as shown in FIG. 7.

Next, the opening control that automatically opens the communication line through the data transmission path 4 of the first module 2a of the computer 301 of the third exemplary embodiment will be described referring to the process flow of FIG. 11.

Figure 11:
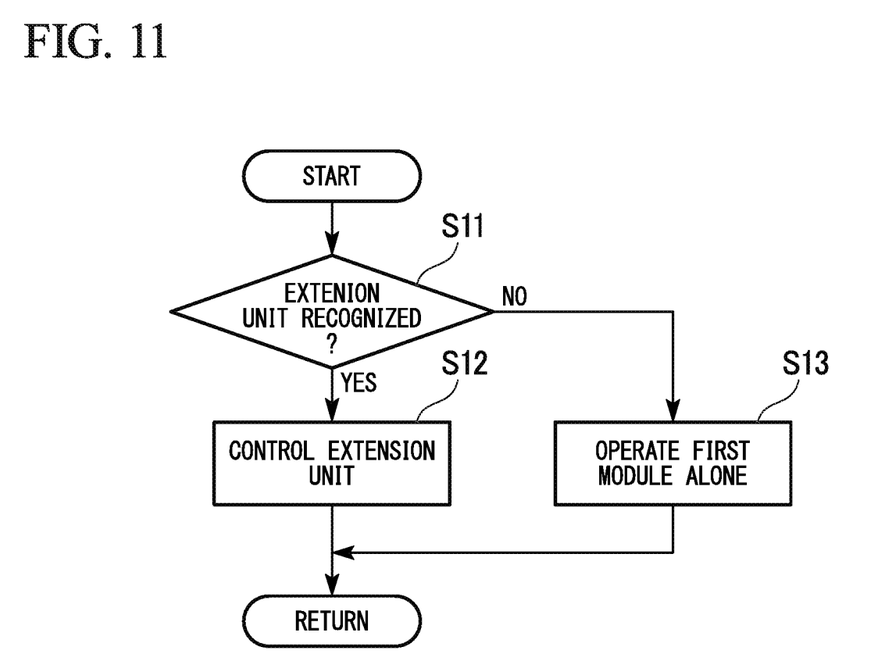
FIG. 11 shows the process flow of opening control executed in a first module in the third exemplary embodiment of the present invention.

FIG. 11 shows the process flow of opening control executed in the first module 2a in the third exemplary embodiment of the present invention.

First, the first module 2a is attached to the first connector 3a. Here, power is supplied to the first module 2a from the first connector 3a. Then, the control unit 12 of the first module 2a determines whether or not the second module 2b is recognized, more specifically, whether the extension unit 13 of the second module 2b is recognized, via the data transmission path 4 (Step S11: determination step).

In the case of the result of the aforementioned determination being that the extension unit 13 of the second module 2b is recognized ("Yes" in Step S1), the control unit 12 of the first module 2a performs a start control of two-way communication with the second module 2b (not illustrated), and starts control of the extension unit 13 of the second module 2b (Step S12: extension control step).

On the other hand, in the case of the result of the aforementioned determination being that the extension unit 13 of the second module 2b is not recognized ("No" in Step S11), the control unit 12 of the first module 2a starts operation as an independent server with the first module 2a alone without performing function extension (Step S13: single operation step).

Accordingly, with the third exemplary embodiment mentioned above, there is no need to provide a dedicated connector for attaching the second module 2b used for extending the server function of the first module 2a. Also, in the case of wanting to extend the server function of the first module 2a, the first module 2a whose function is to be extended is attached to the first connector 3a of the N column, and a second module 2b is attached to the second connector 3b of the N+1 column adjacent to this first connector 3a in the first direction D1. In this manner, it is possible to flexibly and easily perform extension of the server function in accordance with the client's specification.

Moreover, by attaching the first module 2a to the second connector 3b of the N+1 column, it is possible to have the first module 2a attached to the first connector 3a of the N column and the first module 2a attached to the second connector 3b of the N+1 column operate as independent servers.

As a result, it is possible to improve the expandability of servers such as high-density servers, and inhibit complication of server design and cost increases.

Also, when assembling the computer 301 described above, just by attaching the first module 2a or the second module 2b to the second connector 3b, it is possible to select between extending the function of the first module 2a attached to the first connector 3b or causing the first and second modules 2a and 2b to operate individually, without performing such an operation as switching of the data transmission path 4. As a result, it is possible to inhibit complication of the assembly operation, and thereby lighten the burden of the worker.

In addition, in the case of the first modules 2a being attached to both of the first connector 3a and the second connector 3b, it is possible to start the operation of each first module 2a as an independent server without performing a start control in bidirectional communication (ACK response or the like). For that reason, it is possible to rapidly start their operation as servers.

While the invention has been particularly shown and described with reference to exemplary embodiments thereof, the invention is not limited to these embodiments. It will be understood by those of ordinary skill in the art that various changes in form and details may be made therein without departing from the scope of the present invention as defined by the claims.

For example, in each of the above exemplary embodiments, the case has been illustrated of the arrangement of the first electrode 5a in the first connector 3a and the arrangement of the second electrode 5b in the second connector 3b differing in the long-side direction of each of the connectors 3, specifically, the first connector 3a and the second connector 3b. However, the arrangements of the first electrode 5a and the second electrode 5b are not limited to the case of differing in the long-side direction of each connector 3.

Moreover, the shapes of the first connector 3a and the second connector 3b are not limited to the shapes illustrated in each exemplary embodiment.

In addition, in the third exemplary embodiment described above, the case has been illustrated of the second module 2b having the extension unit 13 and performing extension of the communication (LAN) function, but the server extension function is not limited to a communication function.

Also, although its description has been omitted in each of the exemplary embodiments described above, power is supplied via respective power supply lines (not illustrated) to the modules 2 attached to the connectors 3.

The operations of the first module 2a in the computer 101, 201, or 301 may be recorded on a computer-readable recording medium D (refer to FIG. 8 and FIG. 9), and by reading the program into a computer system for control of the control unit 12 of the first module 2a and executing it, may perform the processes of each portion. Note that a "computer system" here includes an operating system and hardware such as peripheral devices.

Also, the "computer system" in the case of using a WWW system is also intended to include a homepage providing environment (or display environment). Furthermore, the "computer-readable recording medium" refers to a magnetic disk, a magneto-optical disk. CD-ROM, DVD-ROM, semiconductor memory and the like. Also, the program may be distributed to a computer system via communication lines, and a computer system that has received this distribution may execute the program.

In addition, the program may be one for realizing some of the functions mentioned above.

Moreover, the program may be a so-called differential file (differential program) capable of realizing the abovementioned functions in combination with a program that has already been stored in the computer system.

What is claimed is:
1. A computer comprising:
a first connector;
a second connector; and
a data transmission path that connects the first connector and the second connector,
the first connector including:
a first connector body to which at least a first module is capable of being attached; and
a first electrode portion which is connected with the data transmission path, the first electrode portion being electrically connected with the first module when the first module is attached to the first connector body, and
the second connector including:
a second connector body to which at least the first module and a second module are alternatively capable of being attached, the second module being controlled by the first module; and
a second electrode portion which is connected with the data transmission path, the second electrode portion being electrically connected with the second module when the second module is attached to the second connector body, the second electrode portion being electrically disconnected from the first module when the first module is attached to the second connector body.

2. A computer comprising:
a first connector;
a second connector; and
a data transmission path that connects the first connector and the second connector,
the first connector including:
a first connector body to which at least a second module is capable of being attached; and
a first electrode portion which is connected with the data transmission path, the first electrode portion being electrically connected with the second module when the second module is attached to the first connector body, and
the second connector including:
a second connector body to which at least a first module and the second module are alternatively capable of being attached; and
a second electrode portion which is connected with the data transmission path, the second electrode portion being electrically connected with the second module when the second module is attached to the second connector body, the second electrode portion being electrically disconnected from the first module when the first module is attached to the second connector body.

3. The computer according to claim 1, wherein arrangement of the first electrode portion with respect to the first connector body is different from arrangement of the second electrode portion with respect to the second connector body.

4. The computer according to claim 1,
wherein the computer includes a plurality of first connectors,
the computer includes a plurality of second connectors,
the first connectors and the second connectors are arranged in a first direction with one of the first connectors and one of the second connectors being arranged alternately.

5. The computer according to claim 4,
wherein the first connectors include a plurality of first connector rows each including first connectors,
the second connectors include a plurality of second connector rows each including second connectors,
the first connector rows and the second connector rows are arranged in a second direction with one of the first connector rows and one of the second connector rows being arranged alternately, the second direction intersects the first direction.

6. A server comprising:
the computer according to claim 1,
wherein the first module includes a control unit, and
the second module includes an extension unit that extends a function of the control unit.

7. The server according to claim 6, further comprising:
a substrate to which the first connector and the second connector are fixed,
wherein the data transmission path is provided on the substrate.

8. A connector set comprising:
a first connector including a first connector body and a first electrode, at least a first module being capable of being attached to the first connector body, the first electrode being electrically connected with the first module when the first module is attached to the first connector body; and
a second connector including a second connector body and a second electrode, at least the first module and a second module being alternatively capable of being attached to the second connector body, the second module being controlled by the first module, the second electrode being electrically connected with the second module when the second module is attached to the second connector body, the second electrode being electrically disconnected from the first module when the first module is attached to the second connector body; and
a data transmission path that connects the first electrode and the second electrode.

9. The connector set according to claim 8, wherein arrangement of the second electrode with respect to the second connector body is different from arrangement of the first electrode with respect to the first connector body.

10. A method for assembling a computer, the method comprising:
attaching a first module to a first connector, the first connector including a first connector body and a first electrode portion, at least the first module and a third module being alternatively capable of being attached to the first connector body, the first electrode portion being connected with a data transmission path, the first electrode portion being electrically connected with the first module when the first module is attached to the first connector body, the first electrode portion being electrically connected with the third module when the third module is attached to the first connector body; and
attaching one of a second module and the third module to a second connector, the second connector including a second connector body and a second electrode portion, at least the third module and the second module being alternatively capable of being attached the second connector body, the second module being controlled by the first module, the second electrode portion being connected with the data transmission path, the second electrode portion being electrically connected with the second module when the second module is attached to the second connector body, the second electrode portion being electrically disconnected from the third module when the third module is attached to the second connector body.

11. A method for controlling a computer, the method comprising:
determining, by at least a first module, whether a second module is recognized;
controlling the second module by the first module when it has been determined that the second module is recognized by the first module; and
operating the first module alone when it has been determined that the second module is not recognized by the first module,
wherein the computer includes: a first connector; a second connector; and a data transmission path that connects the first connector and the second connector, the first connector including: a first connector body to which the first module is capable of being attached; and a first electrode portion which is connected with the data transmission path, the first electrode portion being electrically connected with the first module when the first module is attached to the first connector body, and the second connector including: a second connector body to which at least the first module and the second module are alternatively capable of being attached, the second module being controlled by the first module; and a second electrode portion which is connected with the data transmission path, the second electrode portion being electrically connected with the second module when the second module is attached to the second connector body, the second electrode portion being electrically disconnected from the first module when the first module is attached to the second connector body.

12. A non-transitory computer-readable storage medium storing an opening control program for a first module of a computer, the opening control program causing the first module to execute:
   determining, by the first module, whether a second module is recognized;
   controlling the second module by the first module when it has been determined that the second module is recognized by the first module; and
   operating the first module alone when it has been determined that the second module is not recognized by the first module,
   wherein the computer includes: a first connector; a second connector; and a data transmission path that connects the first connector and the second connector, the first connector including: a first connector body to which at least the first module is capable of being attached; and a first electrode portion which is connected with the data transmission path, the first electrode portion being electrically connected with the first module when the first module is attached to the first connector body, and the second connector including: a second connector body to which at least the first module and the second module are alternatively capable of being attached, the second module being controlled by the first module; and a second electrode portion which is connected with the data transmission path, the second electrode portion being electrically connected with the second module when the second module is attached to the second connector body, the second electrode portion being electrically disconnected from the first module when the first module is attached to the second connector body.

* * * * *